(12) United States Patent
Chen et al.

(10) Patent No.: US 10,560,028 B2
(45) Date of Patent: Feb. 11, 2020

(54) SWITCHING MODE POWER SUPPLY WITH DYNAMIC HIGH-VOLTAGE CHARGING TO MAINTAIN OPERATING VOLTAGE

(71) Applicant: Weltrend Semiconductor Inc., Hsinchu (TW)

(72) Inventors: Chun-Teh Chen, Hsinchu (TW); Yi Lun Shen, Hsinchu (TW); Ren Yi Chen, Hsinchu (TW)

(73) Assignee: WELTREND SEMICONDUCTOR INC., Hsinchu (TW)

( * ) Notice: Subject to any disclaimer, the term of this patent is extended or adjusted under 35 U.S.C. 154(b) by 101 days.

(21) Appl. No.: 15/949,118

(22) Filed: Apr. 10, 2018

(65) Prior Publication Data

US 2018/0316273 A1 Nov. 1, 2018

(30) Foreign Application Priority Data

Apr. 28, 2017 (TW) .............................. 106114187 A

(51) Int. Cl.

| H02M 3/335 | (2006.01) |
|---|---|
| H02J 7/00 | (2006.01) |
| H02M 1/08 | (2006.01) |
| H02M 1/32 | (2007.01) |

(Continued)

(52) U.S. Cl.
CPC ....... *H02M 3/33523* (2013.01); *H02J 7/0052* (2013.01); *H02M 1/08* (2013.01); *H02M 1/32* (2013.01); *H02J 2007/0059* (2013.01); *H02J 2007/0062* (2013.01); *H02M 7/06* (2013.01); *H02M 2001/0006* (2013.01); *H02M 2001/007* (2013.01)

(58) Field of Classification Search
CPC .......... H02M 1/08; H02M 1/36; H02J 7/0052; H02J 2007/0059; H02J 2007/0062
See application file for complete search history.

(56) References Cited

U.S. PATENT DOCUMENTS

| 5,014,178 A * | 5/1991 | Balakrishnan .......... H02M 1/36 363/21.08 |
|---|---|---|
| 5,467,009 A * | 11/1995 | McGlinchey ........... G05F 1/465 323/269 |

(Continued)

*Primary Examiner* — Yusef A Ahmed
(74) *Attorney, Agent, or Firm* — McClure, Qualey & Rodack, LLP

(57) ABSTRACT

A power controller in a switching mode power supply dynamically performs high-voltage charging to maintain an operating voltage. The power controller includes a PWM signal generator, a high-voltage charging circuit, and a high-voltage charging controller. The PWM signal generator provides a PWM signal to a power switch to perform power conversion regulating an output voltage of the switching mode power supply at a voltage rating. The high-voltage charging circuit has a high-voltage-tolerant switch connected between a line voltage and the operating voltage, wherein rectifying an AC voltage generates the line voltage. The high-voltage charging controller turns ON the high-voltage-tolerant switch to perform high-voltage charging at the same time when performing the power conversion. The high-voltage charging directs a charging current from the line voltage through the high-voltage-tolerant switch to charge the operating voltage.

14 Claims, 6 Drawing Sheets

(51) Int. Cl.
*H02M 7/06* (2006.01)
*H02M 1/00* (2006.01)

(56) References Cited

U.S. PATENT DOCUMENTS

| | | | | |
|---|---|---|---|---|
| 8,619,445 | B1* | 12/2013 | Low | H02M 1/32 |
| | | | | 363/59 |
| 8,710,810 | B1* | 4/2014 | McJimsey | H02M 3/1584 |
| | | | | 323/272 |
| 9,112,419 | B2* | 8/2015 | Nate | H02M 3/33507 |
| 9,184,672 | B2* | 11/2015 | Wen | H02M 7/4807 |
| 9,660,664 | B1* | 5/2017 | Price | H03M 1/125 |
| 9,685,875 | B2* | 6/2017 | Nishijima | H02M 3/33523 |
| 9,960,594 | B1* | 5/2018 | Lin | H03K 19/00323 |
| | | | | 327/170 |
| 10,355,578 | B2* | 7/2019 | Nishijima | H02M 3/33523 |
| 10,411,592 | B2* | 9/2019 | Viswanathan | H02M 7/217 |
| 2003/0179029 | A1* | 9/2003 | Eichfeld | H03K 19/00323 |
| | | | | 327/170 |
| 2004/0164716 | A1* | 8/2004 | Walter | H02M 5/22 |
| | | | | 322/8 |
| 2005/0208910 | A1* | 9/2005 | Burns | G01R 31/2607 |
| | | | | 455/127.3 |
| 2007/0176588 | A1* | 8/2007 | Nishida | H02M 3/158 |
| | | | | 323/284 |
| 2007/0291521 | A1* | 12/2007 | Hsu | H02M 1/08 |
| | | | | 363/131 |
| 2008/0129264 | A1* | 6/2008 | Moussaoui | H02M 3/156 |
| | | | | 323/283 |
| 2009/0067199 | A1* | 3/2009 | Van Der Wal | H02M 3/1584 |
| | | | | 363/16 |
| 2010/0308733 | A1* | 12/2010 | Shao | H02M 1/4225 |
| | | | | 315/119 |
| 2010/0309694 | A1* | 12/2010 | Huang | H02M 1/126 |
| | | | | 363/49 |
| 2011/0057520 | A1* | 3/2011 | Chen | G06F 1/26 |
| | | | | 307/125 |
| 2011/0176341 | A1* | 7/2011 | Huang | H02M 1/126 |
| | | | | 363/49 |
| 2012/0112564 | A1* | 5/2012 | Wu | H02M 1/44 |
| | | | | 307/326 |
| 2012/0287682 | A1* | 11/2012 | Zhang | H02M 3/33507 |
| | | | | 363/21.16 |
| 2013/0235623 | A1* | 9/2013 | Huang | H02M 3/156 |
| | | | | 363/21.17 |
| 2013/0301302 | A1* | 11/2013 | Wu | H02M 3/325 |
| | | | | 363/15 |
| 2014/0036558 | A1* | 2/2014 | Tsou | H02M 3/02 |
| | | | | 363/74 |
| 2015/0155786 | A1* | 6/2015 | Shen | H02M 1/32 |
| | | | | 363/15 |
| 2015/0263510 | A1* | 9/2015 | Yang | H05B 33/0887 |
| | | | | 315/119 |
| 2016/0028302 | A1* | 1/2016 | Low | H02M 3/073 |
| | | | | 363/50 |
| 2016/0111961 | A1* | 4/2016 | Balakrishnan | H02M 3/33507 |
| 2016/0308452 | A1* | 10/2016 | Motoki | H02M 3/156 |
| | | | | 323/283 |
| 2017/0366091 | A1* | 12/2017 | Langeslag | H02M 3/1584 |
| | | | | 323/272 |
| 2017/0366092 | A1* | 12/2017 | Langeslag | H02M 7/217 |
| 2018/0088651 | A1* | 3/2018 | Su | G01R 31/2607 |
| | | | | 455/127.3 |
| 2019/0020266 | A1* | 1/2019 | Chiu | G05F 1/465 |
| | | | | 323/269 |
| 2019/0036458 | A1* | 1/2019 | Shen | H03M 1/125 |
| 2019/0074761 | A1* | 3/2019 | Matsuda | H02M 1/08 |

* cited by examiner

SWITCHING MODE POWER SUPPLY WITH DYNAMIC HIGH-VOLTAGE CHARGING TO MAINTAIN OPERATING VOLTAGE

CROSS-REFERENCE TO RELATED APPLICATION

This application claims priority to and the benefit of Taiwan Application Series Number 106114187 filed on Apr. 28, 2017, which is incorporated by reference in its entirety.

BACKGROUND

The present disclosure relates generally to switching mode power supplies (SMPSs), more particularly to SMPSs capable of performing high-voltage charging while maintaining their operating voltages and the relevant control methods.

Universal Serial Bus (USB) is one of the communication interfaces most broadly used in daily life nowadays. Beside its reliable, rapid data transmission, USB also provides limited power to the peripherals connected to it. Most mobile phones are charged using USB chargers, for example.

To make USB more suitable for powering various electric apparatuses and reducing the number of power cables needed, USB Implementers Forum Inc., a non-profit corporation founded by the group of companies that developed the USB specification, has announced USB Power Delivery (PD) to enable the maximum functionality of USB by providing more flexible power delivery along with data over a single cable. USB PD offers increased power levels from existing standards up to 100 W, so it is possible to enable new higher power use cases such as USB powered hard disk drivers and printers.

USB PD requires a USB charger having its output voltage variable in a range from 5V to 20V, and this range could be expanded as broad as being from 3V to 20V in the future. So far, the voltage ratings of a USB charger complying USB PD are 5V, 12V and 20V. If a USB charger employs isolation topology, meaning no direct-current (DC) connection between the output voltage of the USB charger and the power grid powering the USB charger, the operating voltage $V_{DD}$ powering an integrated circuit at a primary side is normally generated by rectifying an induced voltage across an auxiliary winding of a transformer. The induced voltage of the auxiliary winding, as it is named, changes following the change to the output voltage $V_{OUT}$, so does the operating voltage $V_{DD}$. Conventional integrated circuits normally sustain operating voltage $V_{DD}$ up to about 30V, and need operating voltage $V_{DD}$ more than 10V to drive a power switch. If it is configured that the output voltage $V_{OUT}$ is 20V to induce the operating voltage $V_{DD}$ of 30V, then, when the output voltage $V_{OUT}$ is 5V, which is the minimum voltage rating defined by USB PD, the operating voltage $V_{DD}$ will be as low as 7.5V, probably too low to power an integrated circuit.

To solve the problem mentioned in the previous paragraph, FIG. 1 provides a conventional USB charger 10, including a transformer with a primary winding PRM, a secondary winding SEC, and an auxiliary winding AUX, all inductively coupled to one another. An alternating-current voltage from a power grid is rectified by a bridge rectifier 12 to generate an input voltage $V_{IN}$ at power node IN. Resistor $R_{HV}$ is connected between power node IN and high-voltage node HV, providing power controller 18 the current required for high-voltage startup.

Power controller 18, an integrated circuit at the primary side, provides PWM signal $S_{DRV}$ to drive power switch 20, which equivalently chops input voltage $V_{IN}$ to generate alternating-current voltage $V_{SEC}$ across secondary winding SEC. By rectifying alternating-current $V_{SEC}$ output voltage $V_{OUT}$ is generated at output node OUT to power load 24, which for example is a mobile phone or a set of batteries connected to an USB port (not shown).

Operational amplifier 22 compares output voltage $V_{OUT}$ with target voltage $V_{TAR}$, and its output, via photo coupler 26, controls compensation voltage $V_{COMP}$ at compensation node COMP, based on which power controller 18 controls the duty cycle and the switching frequency of PWM signal $S_{DRV}$. Accordingly, USB charger 10 employs a close loop to regulate output voltage $V_{OUT}$ at about target voltage $V_{TAR}$. Target voltage $V_{TAR}$ is set to be 20V if the voltage rating of USB charger 10 is 20V, and it is switched to become 5V if the voltage rating is changed to be 5V.

USB charger 10 has a low drop out linear regulator (LDO) 16, connected in series with rectifying diode $D_{AUX}$ between power node VDD and a terminal of auxiliary winding AUX. Operating voltage $V_{DD}$ at power node VDD performs as a power source to power power controller 18. LDO 16 clamps operating voltage $V_{DD}$, making it not more than the maximum operating voltage that power controller 18 can sustain. In light of system configuration, when output voltage $V_{OUT}$ is 5V, an induced voltage $V_{AUX}$ of auxiliary winding AUX could be designed to be about the minimum operating voltage required for power controller 18 to operate normally, and this minimum operating voltage is 10V for example. Meanwhile, LDO 16 seemingly functions as a short circuit, making operating voltage $V_{DD}$ about 10V, just high enough for the normal operation of power controller 18. In case that output voltage $V_{OUT}$ is 20V, induced voltage $V_{AUX}$ becomes 40V, so LDO 16 consumes 10V drop to clamp operating voltage $V_{DD}$ at 30V, preventing power controller 18 from damage of over-voltage stress.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

A USB charger is used as an embodiment of the invention, but the invention is not limited to. Embodiments of the invention include other kinds of switching mode power supplies, and the disclosure of this invention is not on purpose to limit the scope of the invention.

Figure 1:
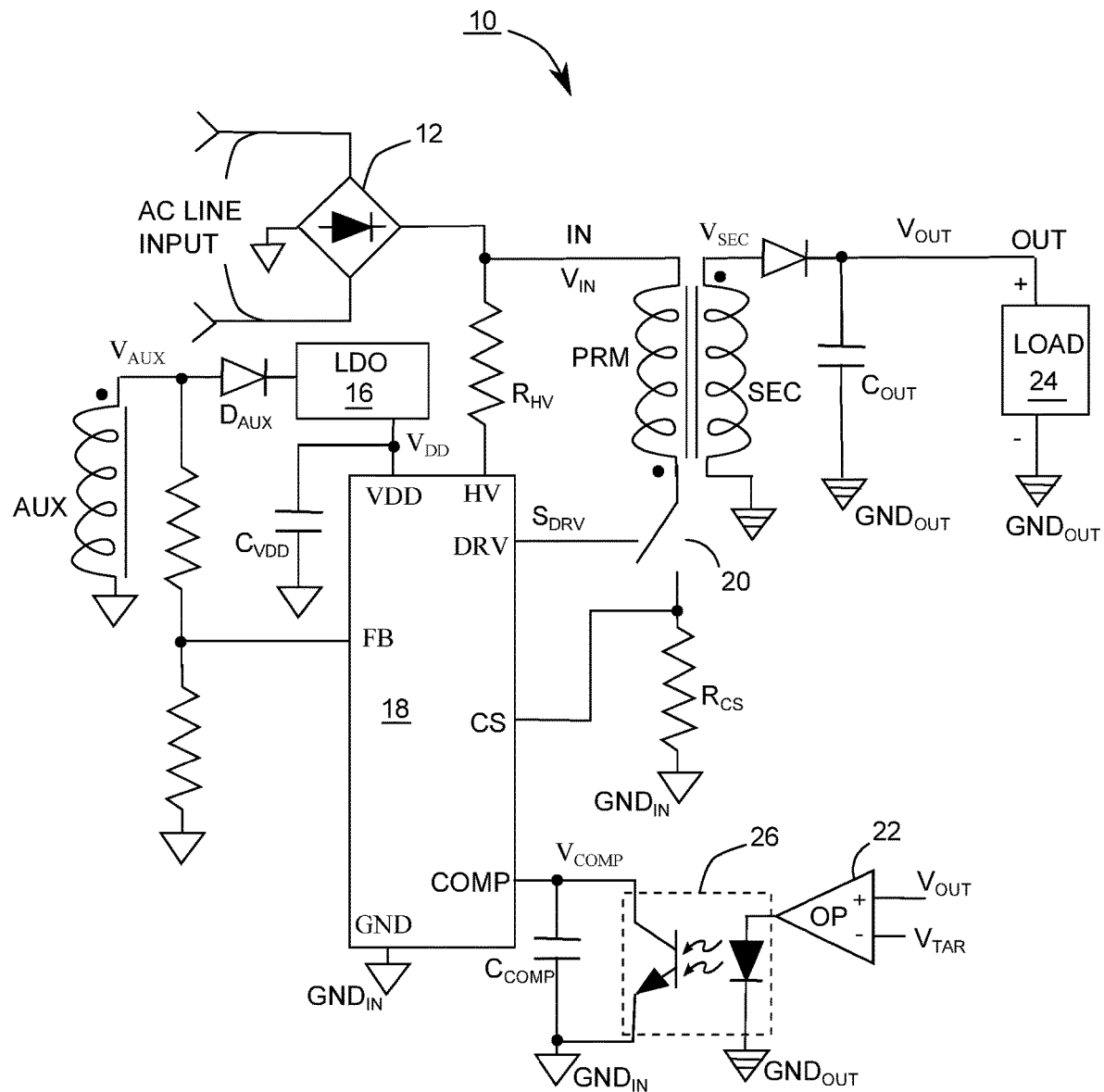
FIG. 1 shows a conventional USB charger.

A USB charger according to embodiments of the invention does not need LDO 16 of USB charger 10 in FIG. 1, and is capable of keeping operating voltage $V_{DD}$ within a safe range, inside which the maximum voltage will not damage a power controller and the minimum voltage allows the power controller operating normally, no matter the voltage rating is 5V or 20V. Accordingly, it is possible for a USB charger according to the invention to enjoy a lower manufacturing cost, in comparison with the conventional USB charger 10 in FIG. 1.

According to an embodiment of the invention, induced voltage $V_{AUX}$ of auxiliary winding AUX is configured to be 30V when output voltage $V_{OUT}$ is regulated at 20V, the maximum voltage rating, so operating voltage $V_{DD}$, directly generated by rectifying induced voltage $V_{AUX}$ without the help from an LDO, is about 30V. When output voltage $V_{OUT}$ is regulated at 5V, the minimum voltage rating, and induced voltage $V_{AUX}$ is expected to become 7.5V in proportion, a power controller according to the embodiment of the invention activates high-voltage charging, which drains or directs a charging current from high-voltage node HV to charge operating voltage $V_{DD}$, to keep operating voltage $V_{DD}$ higher than 10V. As induced voltage $V_{AUX}$ of auxiliary winding AUX is lower than operating voltage $V_{DD}$ when output voltage $V_{OUT}$ is regulated at 5V, the energy required for operating voltage $V_{DD}$ is solely provided by the high-voltage charging from high-voltage node HV. The high-voltage charging is deactivated when output voltage $V_{OUT}$ is regulated at 20V, so the energy required for operating voltage $V_{DD}$ is solely provided by rectifying induced voltage $V_{AUX}$. Accordingly, no matter output voltage $V_{OUT}$ is regulated at 5V or 20V, operating voltage $V_{DD}$ is maintained within the safe range from 10V to 30V to make a power controller operate properly.

Figure 2:
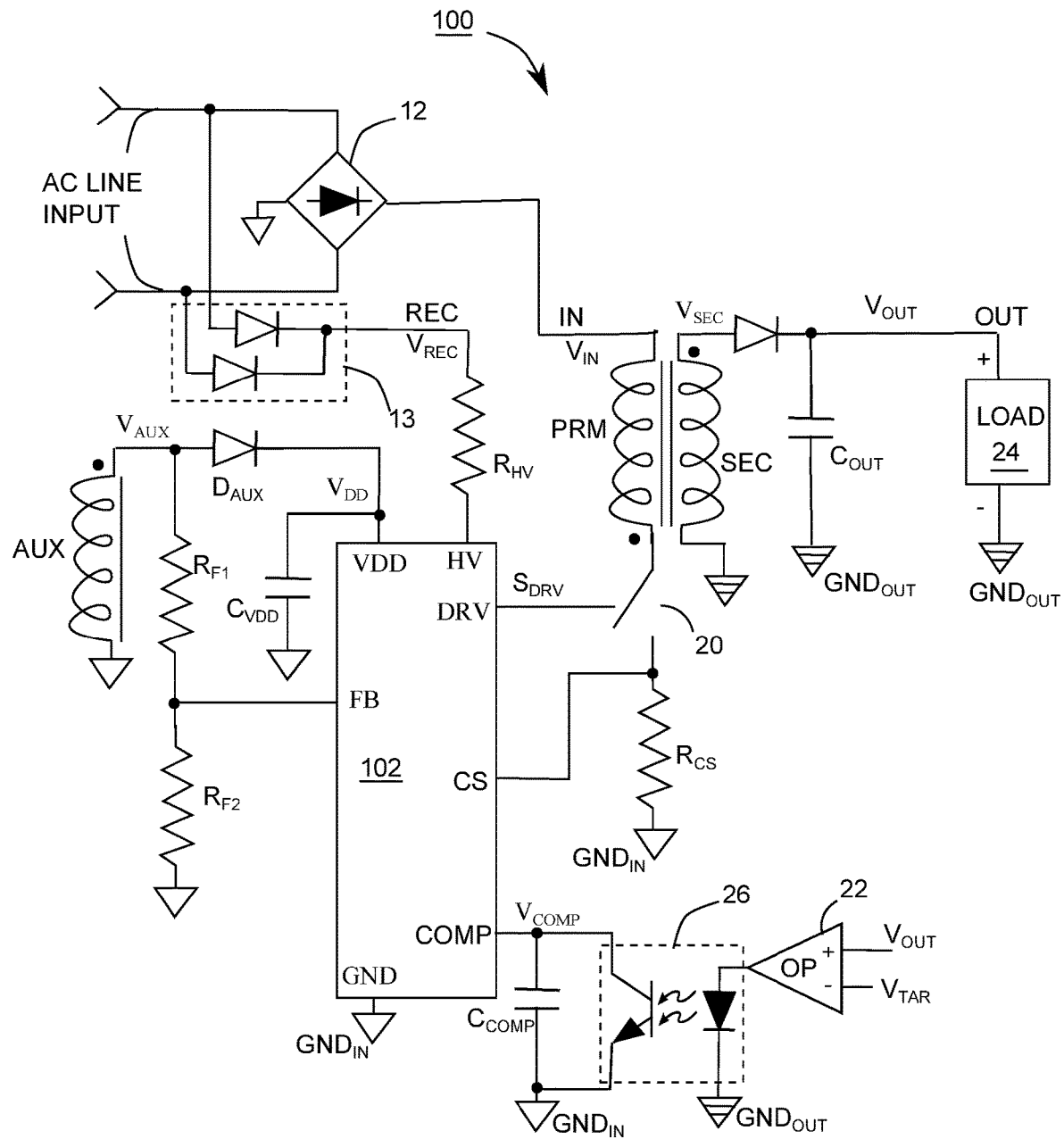
FIG. 2 demonstrates a USB charger according to embodiments of the invention.

FIG. 2 demonstrates USB charger 100 according to embodiments of the invention. USB charger 100 has a transformer including primary winding PRM, secondary winding SEC, and auxiliary winding AUX. An alternating-current voltage from a power grid is rectified by bridge rectifier 12 to generate both input voltage $V_{IN}$ at power node IN and 0V at input ground node $GND_{IN}$. Rectifier 13 rectifies the alternating-current voltage from the power grid to generate line voltage $V_{REC}$. According to embodiments of the invention, input voltage $V_{IN}$ is about at a positive voltage relatively stable in comparison with the periodical variation occurring at the alternating-current voltage from the power grid, and line voltage $V_{REC}$ has a M-shaped waveform, whose voltage value varies following the periodical variation of the alternating-current voltage from the power grid. Resistor $R_{HV}$ is connected between rectification node REC and high-voltage node HV, for providing the current needed for high-voltage startup of power controller 102. Voltage $V_{HV}$ at high-voltage node HV is about or little less than line voltage $V_{REC}$.

In one embodiment, power controller 102 is a packaged integrated circuit at a primary side, and provides PWM signal $S_{DRV}$ via drive node DRV to drive power switch 20, which equivalently chops input voltage $V_{IN}$ to generate alternating-current voltage $V_{SEC}$ across secondary winding SEC. By rectifying alternating-current $V_{SEC}$, output voltage $V_{OUT}$ at output node OUT is generated by a rectifying diode and an output capacitor $C_{OUT}$ to power or charge load 24, which for example is a mobile phone or a set of batteries connected to an USB port (not shown). Load 24 is connected between output node OUT and secondary-side ground node $GND_{OUT}$.

Operational amplifier 22 compares output voltage $V_{OUT}$ with target voltage $V_{TAR}$, and its output, via photo coupler 26, controls compensation voltage $V_{COMP}$ at compensation node COMP. Compensation capacitor $C_{COMP}$ is connected between compensation node COMP and input ground node $GND_{IN}$. Based on compensation voltage $V_{COMP}$, power controller 18 controls the duty cycle and the switching frequency of PWM signal $S_{DRV}$. Accordingly, USB charger 100 employs a close loop to regulate output voltage $V_{OUT}$ at about target voltage $V_{TAR}$. A secondary-side control circuit (not shown) sets target voltage $V_{TAR}$ to be 20V if the voltage rating of USB charger 100 is 20V, and switches target voltage $V_{TAR}$ to become 5V if the voltage rating of USB charger 100 is 5V.

The joint between resistors $R_{F1}$ and $R_{F2}$ is connected to feedback node FB of power controller 102, so as to let power controller 102 detect induced voltage $V_{AUX}$ across auxiliary winding AUX. Diode $D_{AUX}$ and capacitor $C_{VDD}$ together act as a rectifier, rectifying induced voltage $V_{AUX}$ to generate operating voltage $V_{DD}$ at power node VDD. Induced voltage $V_{AUX}$ influences operating voltage $V_{DD}$ only if the former is larger than the latter. If induced voltage $V_{AUX}$ is less than operating voltage $V_{DD}$, diode $D_{AUX}$ isolates operating voltage $V_{DD}$ from induced voltage $V_{AUX}$, which accordingly cannot influence operating voltage $V_{DD}$.

Figure 3:
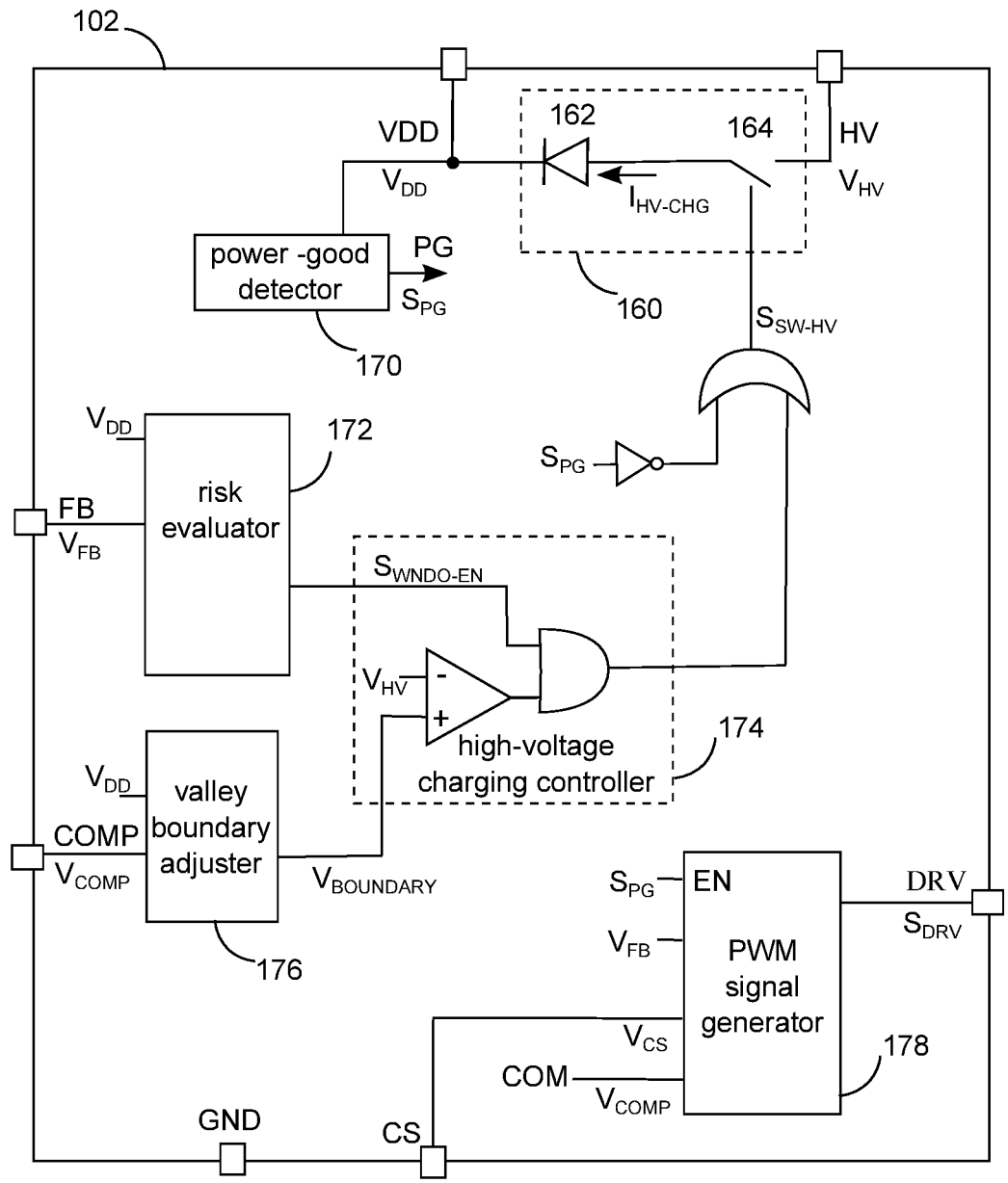
FIG. 3 shows the power controller in FIG. 2.

FIG. 3 shows power controller 102 in FIG. 2, including high-voltage charging circuit 160, power-good detector 170, risk evaluator 172 for power failure, high-voltage charging controller 174, valley boundary adjuster 176 and PWM signal generator 178.

High-voltage charging circuit 160 is connected between high-voltage node HV and power node VDD, including diode 162 and high-voltage-tolerant switch 164 connected in series. For example, high-voltage-tolerant switch 164 can sustain a drain-to-source voltage as high as 800V without breakdown. When high-voltage-tolerant switch 164 is turned ON, high-voltage charging circuit 160 performs high-voltage charging, draining charging current $I_{HV-CHG}$ from high-voltage node HV to charge operating voltage $V_{DD}$.

Power-good detector 170 detects operating voltage $V_{DD}$ to assert or de-assert power good signal $S_{PG}$. If operating voltage $V_{DD}$ is good enough for power controller 102 to turn ON power switch 20, good signal $S_{PG}$ is asserted. If not, good signal $S_{PG}$ is de-asserted and power switch 20 is constantly turned OFF. When power good signal $S_{PG}$ is de-asserted, most of the circuits in power controller 102 sleeps or does not work to reduce power consumption, and the circuits awake or working normally might include power-good detector 170 and high-voltage charging circuit 160. De-asserted power good signal $S_{PG}$ causes high-voltage-tolerant switch 164 turned ON to provide charging current charging operating voltage $V_{DD}$, whose voltage value increases over time hopefully. When power good signal $S_{PG}$ is asserted, meaning operating voltage $V_{DD}$ is ready for power controller 102 to perform power conversion, all the circuits in power controller 102 become awake, working properly. Asserted power good signal $S_{PG}$ could cause high-voltage-tolerant switch 164 turned OFF, as derivable from FIG. 3.

When power good signal $S_{PG}$ is asserted, high-voltage charging controller 174 could dynamically turn ON or OFF high-voltage-tolerant switch 164. De-asserted enable signal $S_{WNDO-EN}$ disenables high-voltage charging controller 174, which accordingly turns OFF high-voltage-tolerant switch 164. To reduce power consumed by high-voltage-tolerant switch 164, high-voltage charging controller 174 turns ON high-voltage-tolerant switch 164 to perform the high-voltage charging only during valley period $T_{HV-VLY}$, which refers to the occurrence of a voltage valley of line voltage $V_{REC}$ according to embodiments of the invention. In the embodiment shown in FIG. 3, valley period $t_{HV-VLY}$ means a period of time when voltage $V_{HV}$ at high-voltage node HV, which generally is about equal to line voltage $V_{REC}$, is less than boundary voltage $V_{BOUNDARY}$. The start and the end of valley period $T_{HV-VLY}$ are determined by the comparator in high-voltage charging controller 174. Valley period $T_{HV-VLY}$ also means a period of time when line voltage $V_{REC}$ is inside a voltage valley.

Risk evaluator 172 detects feedback voltage $V_{FB}$ at feedback node FB and operating voltage $V_{DD}$, to identify whether operating voltage $V_{DD}$ is facing risk of power failure. Risk evaluator 172 accordingly asserts or dis-asserts enable signal $S_{WNDO-EN}$, so as to enable or disable high-voltage charging controller 174. If risk evaluator 172 determines it might be impossible for operating voltage $V_{DD}$ to become too low, then high-voltage charging is unnecessary and high-voltage charging controller 174 is disabled.

According to operating voltage $V_{DD}$ and compensation voltage $V_{COMP}$, valley boundary adjuster 176 in FIG. 3 adaptively adjusts boundary voltage $V_{BOUNDARY}$, so as to change the length of valley period $T_{HV-VLY}$.

PWM signal generator 178 generates PWM signal $S_{DRV}$ in response to feedback voltage $V_{FB}$, current sense signal $V_{CS}$ at current detection node CS, and compensation voltage $V_{COMP}$. PWM signal generator 178 is capable of modify the duty cycle and/or switching frequency of PWM signal $S_{DRV}$ to control the power conversion from the primary side to the secondary side for powering output voltage $V_{OUT}$. When power good signal $S_{PG}$ is de-asserted, PWM signal generator 178 is disenabled, constantly turning OFF power switch 20 and stopping the power conversion.

Figure 4:
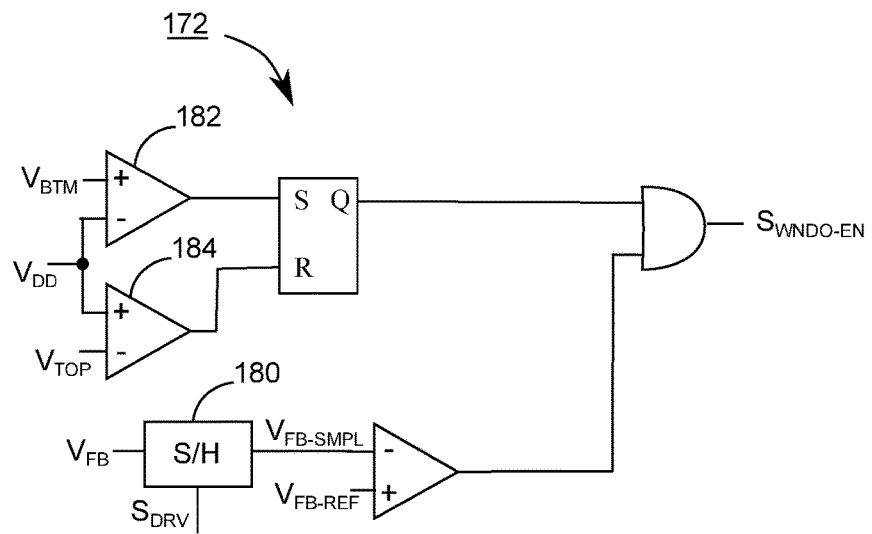
FIG. 4 shows the risk evaluator in FIG. 3.

FIG. 4 shows risk evaluator 172 in FIG. 3 that evaluates if operating voltage $V_{DD}$ is under the risk of power failure. In order to detect output voltage $V_{OUT}$, sample and hold circuit 180 samples feedback voltage $V_{FB}$ at an appropriate moment in a switching cycle, and accordingly holds and outputs sample voltage $V_{FB-SMPL}$, a representative of output voltage $V_{OUT}$, which is compared with reference voltage $V_{FB-REF}$. In other words, risk evaluator 172 detects output voltage $V_{OUT}$ via feedback node FB and auxiliary winding AUX. In case that output voltage $V_{OUT}$ exceeds a predetermined value $V_{OUT-REF}$ corresponding to reference voltage $V_{FB-REF}$ operating voltage $V_{DD}$, which somehow reflects output voltage $V_{OUT}$, should be high enough without risk of power failure, so enable signal $S_{WNDO-EN}$ is kept de-asserted, stopping the high-voltage charging since it is unnecessary at this circumstance. Risk evaluator 172 has two comparators 182 and 184 to directly check if operating voltage $V_{DD}$ is within a predetermined control range from bottom-limit voltage $V_{BTM}$ to top-limit voltage $V_{TOP}$. If operating voltage $V_{DD}$ exceeds top-limit voltage $V_{TOP}$ enable signal $S_{WNDO-EN}$ is de-asserted, to disable the high-voltage charging; if operating voltage $V_{DD}$ is less than bottom-limit voltage $V_{BTM}$, enable signal $S_{WNDO-EN}$ is asserted, to enable the high-voltage charging.

Figure 5:
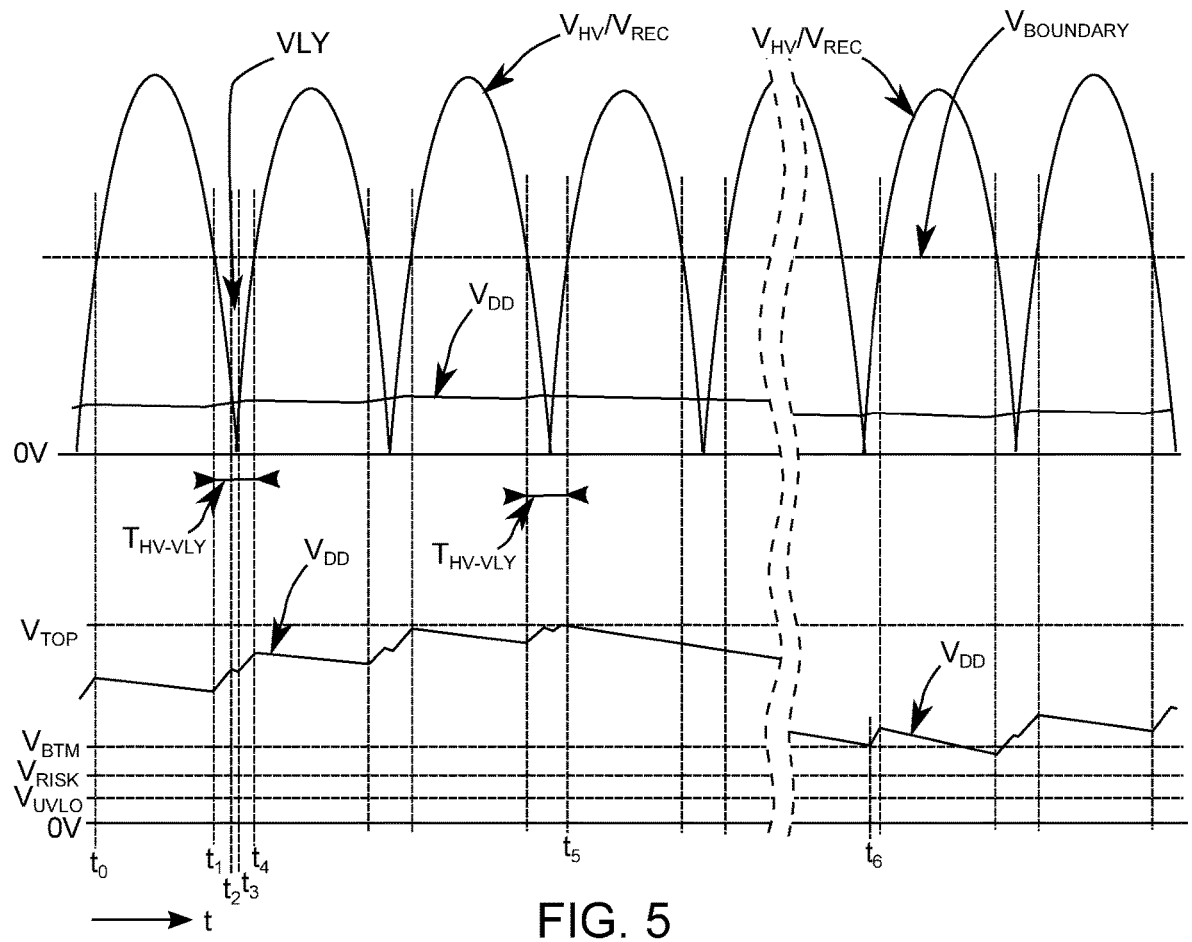
FIG. 5 demonstrates the waveforms of voltage $V_{HV}$/line voltage $V_{REC}$, and operating voltage $V_{DD}$.

FIG. 5 demonstrates the waveforms of voltage $V_{HV}$/line voltage $V_{REC}$, and operating voltage $V_{DD}$. In order to make comparison easier, the waveform of operating voltage $V_{DD}$ is also duplicated to superimpose over the waveform of voltage $V_{HV}$/line voltage $V_{REC}$.

As shown in FIG. 5, every valley period $T_{HV-VLY}$ is the period of time when voltage $V_{HV}$ is below boundary voltage $V_{BOUNDARY}$. For example, one valley period $T_{HV-VLY}$ when line voltage $V_{REC}$ is inside a voltage valley VLY starts from moment $t_1$ to moment $t_4$.

It is supposed that enable signal $S_{WNDO-EN}$ is de-asserted at moment $t_0$. So high-voltage charging controller 174 turns ON high-voltage-tolerant switch 164 in the following valley periods $T_{HV-VLY}$, performing the high-voltage charging to increase operating voltage $V_{DD}$. It is possible that voltage $V_{HV}$ happens to be less than operating voltage $V_{DD}$ within a valley period $T_{HV-VLY}$, as demonstrated by the lost period from moment $t_2$ to moment $t_3$. During the lost period, even though high-voltage-tolerant switch 164 is turned ON, the high-voltage charging cannot sink current from voltage $V_{HV}$/line voltage $V_{REC}$, so operating voltage $V_{DD}$ slides down slightly. Outside the valley periods $T_{HV-VLY}$ in FIG. 5, high-voltage-tolerant switch 164 is turned OFF and the high-voltage charging is disabled, operating voltage $V_{DD}$ ramping down as power controller 102 continues consuming power from operating voltage $V_{DD}$.

Operating voltage $V_{DD}$ exceeds top-limit voltage $V_{TOP}$ at moment $t_5$ in FIG. 5. It seems the high-voltage charging becomes redundant because operating voltage $V_{DD}$ is presently so high. Accordingly, starting from moment $t_5$, enable signal $S_{WNDO-EN}$ is de-asserted to turn OFF high-voltage-tolerant switch 164, no matter a valley period $T_{HV-VLY}$ occurs or not. Therefore, operating voltage $V_{DD}$ ramps down after moment $t_5$.

Operating voltage $V_{DD}$ touches bottom-limit voltage $V_{BTM}$ at moment $t_6$ in FIG. 5, asserting enable signal $S_{WNDO-EN}$. Accordingly, the high-voltage charging performs within every valley period $T_{HV-VLY}$ after moment $t_6$ to increase operating voltage $V_{DD}$, as shown in FIG. 5.

Figure 6:
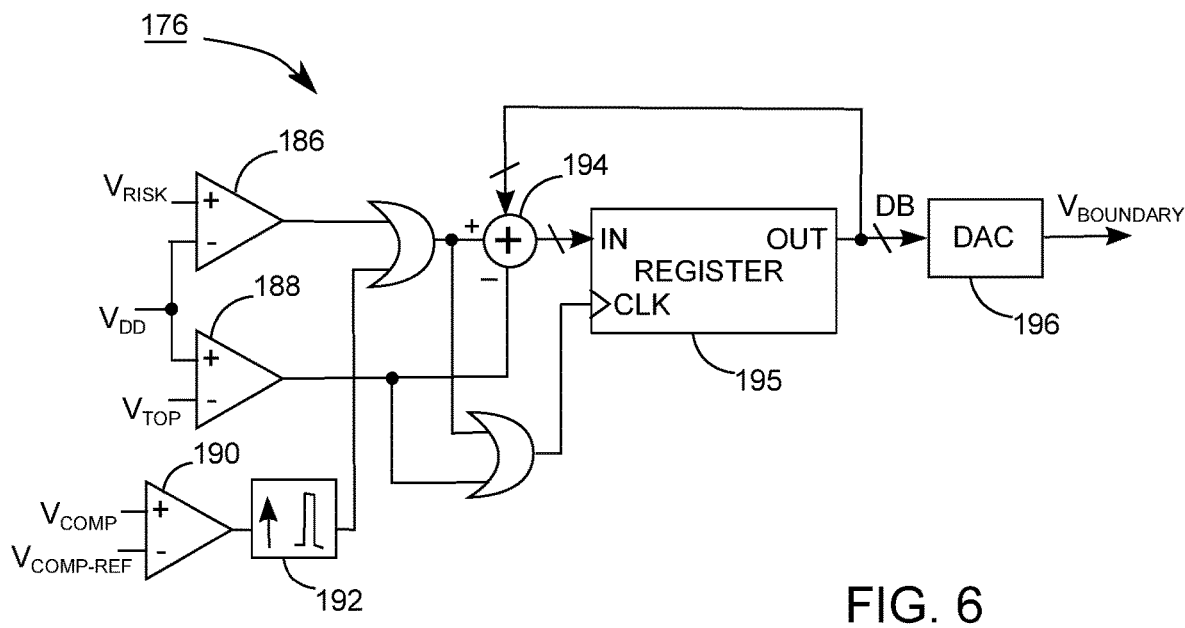
FIG. 6 demonstrates the valley boundary adjuster of FIG. 3.

FIG. 6 demonstrates valley boundary adjuster 176 of FIG. 3, including three comparators 186, 188 and 190, pulse generator 192, adder 194, register 195, and a digital-to-analog converter (DAC) 196. Valley boundary adjuster 176 in FIG. 6 adaptively adjusts boundary voltage $V_{BOUNDARY}$ to make operating voltage $V_{DD}$ substantially kept within an expected range from risk voltage $V_{RISK}$ to top-limit voltage $V_{TOP}$.

According to the embodiment shown in FIG. 6, there are two circumstances causing increment to boundary voltage $V_{BOUNDARY}$ and valley period $T_{HV-VLY}$. One is detected by comparator 190 when compensation voltage $V_{COMP}$ exceeds reference voltage $V_{COMP-REF}$; the other detected by comparator 186 when operating voltage $V_{DD}$ goes under risk voltage $V_{RISK}$.

If compensation voltage $V_{COMP}$ exceeds reference voltage $V_{COMP-REF}$, load 24 seemingly becomes so heavy that the switching frequency of PWM signal $S_{DRV}$ need increase to convert more power for maintaining output voltage $V_{OUT}$, and power controller 102 should expectedly consume more power from operating voltage $V_{DD}$. Therefore, increment to boundary voltage $V_{BOUNDARY}$ and valley period $T_{HV-VLY}$ is provided to more charge operating voltage $V_{DD}$, as a precaution against power failure. When compensation voltage $V_{COMP}$ exceeds reference voltage $V_{COMP-REF}$ pulse generator 192 provides a pulse, which causes a logic "1" at a non-inverted node of adder 194 and a rising edge at clock input CLK of register 195, making register 195 hold digital data DB at its output port OUT as a copy of the present digital data at its own input port IN, which is one more than a previous digital data at input port IN. Digital-to-analog converter 196 converts digital data DB into boundary voltage $V_{BOUNDARY}$. In other words, when compensation voltage $V_{COMP}$ exceeds reference voltage $V_{COMP-REF}$, digital data DB at output port OUT of register 195 increases by one, so boundary voltage $V_{BOUNDARY}$ and valley period $T_{HV-VLY}$ both increase.

Analogously, in the embodiment of FIG. 6, when operating voltage $V_{DD}$ becomes lower than risk voltage $V_{RISK}$, boundary voltage $V_{BOUNDARY}$ and valley period $T_{HV-VLY}$ both increase to prevent operating voltage $V_{DD}$ from becoming less than under-voltage-lockout $V_{UVLO}$. If operating voltage $V_{DD}$ is accidentally less than under-voltage-lockout $V_{UVLO}$, power controller 102 resets, power good signal $S_{PG}$ de-asserts, and the power conversion for the primary side to the secondary side stops.

According to the embodiment shown in FIG. 6, if operating voltage $V_{DD}$ exceeds top-limit voltage $V_{TOP}$, it implies the charge currently provided by the high-voltage charging during valley periods $T_{HV-VLY}$ is so abundant that operating voltage $V_{DD}$ can reach a really high level. To reduce power consumption caused by the high-voltage charging that high-voltage charging circuit 160 performs, boundary voltage $V_{BOUNDARY}$ and valley period $T_{HV-VLY}$ both decrease when operating voltage $V_{DD}$ exceeds top-limit voltage $V_{TOP}$.

Top-limit voltage $V_{TOP}$, bottom-limit voltage $V_{BTM}$, risk voltage $V_{RISK}$, and under-voltage-lock-out $V_{UVLO}$ are demonstrated in FIG. 5. Among them, top-limit voltage $V_{TOP}$ is the highest and under-voltage-lock-out $V_{UVLO}$ the lowest.

Figure 7:
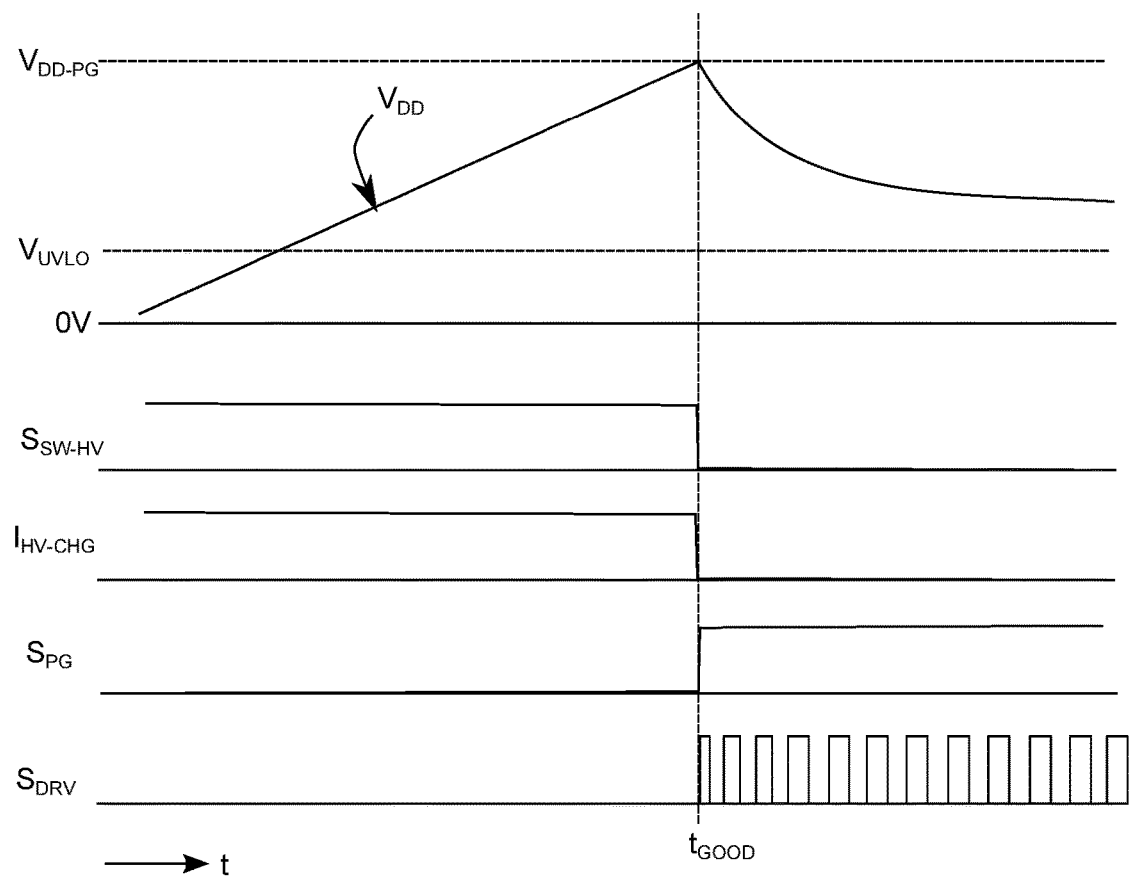
FIG. 7 demonstrates signal waveforms of the power controller in FIG. 3 during and after a high-voltage startup procedure.

FIG. 7 demonstrates signal waveforms of power controller 102 during and after a high-voltage startup procedure. In the beginning, operating voltage $V_{DD}$ is under under-voltage-lock-out $V_{UVLO}$ so power good signal $S_{PG}$ de-asserts and high-voltage-tolerant switch 164 in high-voltage charging circuit 160 turns ON, performing the high-voltage charging. As charging current $I_{HV-CHG}$ flows through high-voltage-tolerant switch 164 to charge operating voltage $V_{DD}$, operating voltage $V_{DD}$ increases over time. Power good signal $S_{PG}$ is kept de-asserted until moment $t_{GOOD}$ until moment $t_{GOOD}$ when operating voltage $V_{DD}$ exceeds a power-ready reference voltage $V_{DD-GD}$. Before moment $t_{GOOD}$, PWM signal $S_{DRV}$ is kept as being logic "0", constantly turning OFF power switch 20 and stopping the power conversion from the primary side to the secondary side. The high-voltage startup procedure concludes at moment $T_{GOOD}$, after which the duty cycle and switching frequency of PWM signal $S_{DRV}$ become non-zero and the power conversion from the primary side to the secondary side starts.

Figure 8:
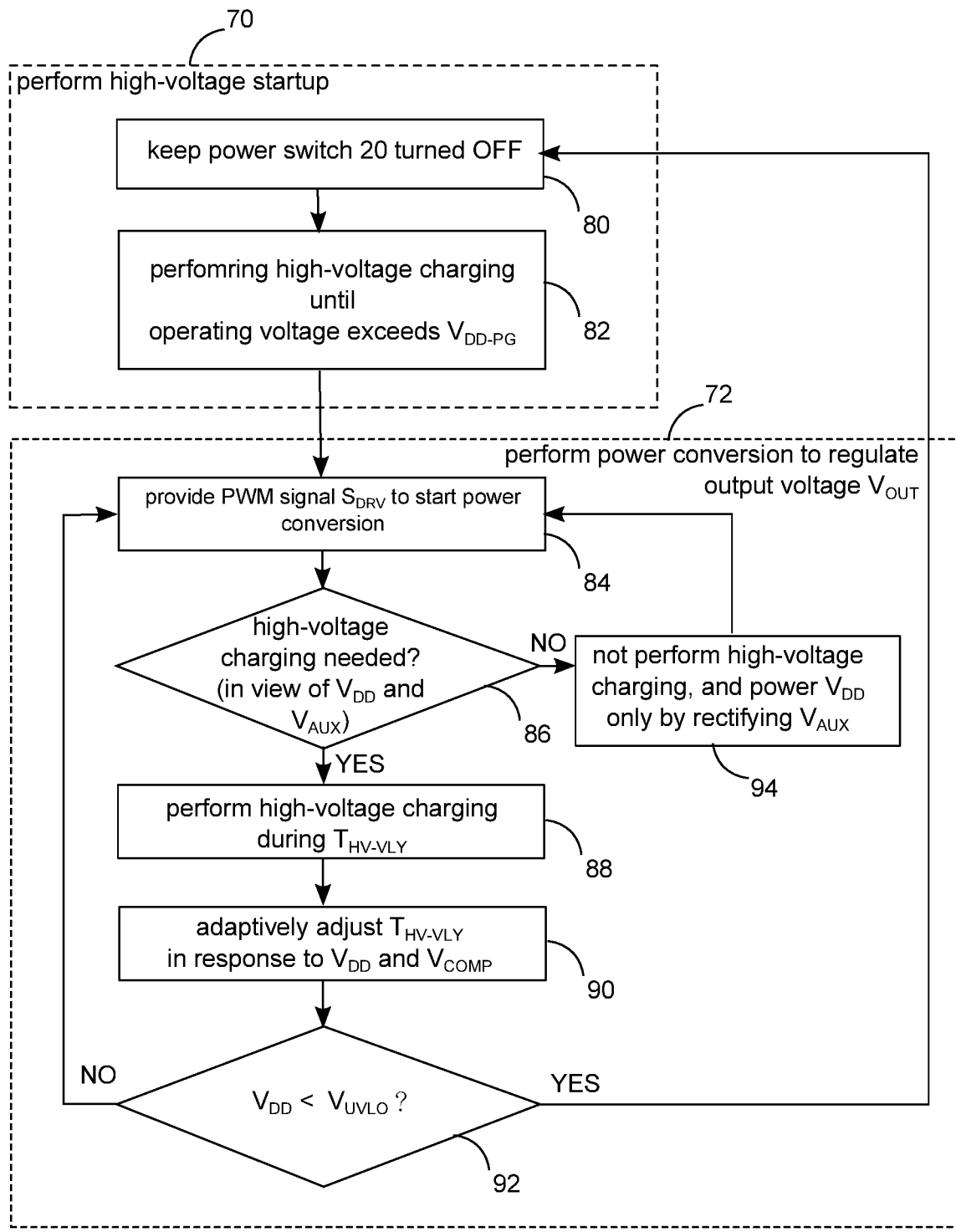
FIG. 8 demonstrates a control method for the high-voltage charging, suitable to be used by the power controller in FIG. 3.

FIG. 8 demonstrates a control method for the high-voltage charging, suitable to be used by power controller 102.

Step group 70 performs high-voltage startup. Step 80 in step group 70 keeps power switch 20 turned OFF, stopping the power conversion from the primary side to the secondary side. Step 82 performs the high-voltage charging, draining charging current $I_{HV-CHG}$ from high-voltage node HV to charge operating voltage $V_{DD}$. The high-voltage charging in step 82 continues until operating voltage $V_{DD}$ exceeds power-ready reference voltage $V_{DD-PG}$.

Step group 72, following step 82, converts power from the primary side to the secondary side and, at the same time, tries to main operating voltage within a safe range. In step group 72, step 84 provides PWM signal $S_{DRV}$, starting the power conversion from the primary side to the secondary side to regulate the output voltage $V_{OUT}$ at a selected voltage rating. Step 86 decides whether to perform the high-voltage charging in view of operating voltage $V_{DD}$ and induced voltage $V_{AUX}$. If the answer to the inquiry of step 86 is negative, step 94 follows, the high-voltage charging disabled and operating voltage $V_{DD}$ powered solely by rectifying induced voltage $V_{AUX}$. If the answer to the inquiry of step 86 is positive, step 88 follows, performing the high-voltage charging during valley period $T_{HV-VLY}$ to drain charging current $I_{HV-CHG}$ from high-voltage node HV to power operating voltage $V_{DD}$. Step 90 follows step 88, adaptively adjusting boundary voltage $V_{BOUNDARY}$ and valley period $T_{HV-VLY}$ in response to operating voltage and compensation voltage $V_{COMP}$. Following step 90, step 92 check if operating voltage $V_{DD}$ is below under-voltage-lock-out voltage $V_{UVLO}$. A positive answer from step 92 causes power controller 102 to be reset, and the method in FIG. 8 jumps back to step group 70 performing high-voltage startup. A negative answer from step 92 leads the method in FIG. 8 to step 84, continuing the power conversion to regulate the output voltage $V_{OUT}$. Step 84 also follows step 94, as shown in FIG. 8.

An embodiment of the invention has the following settings. Top-limit voltage $V_{TOP}$, bottom-limit voltage $V_{BTM}$, risk voltage $V_{RISK}$, under-voltage-lock-out voltage $V_{UVLO}$ are 12V, 11V, 10V and 5V respectively. The turns ratio of the transformer in FIG. 2 is configured to make induced voltage $V_{AUX}$ 30V when output voltage $V_{OUT}$ is 20V, and induced voltage $V_{AUX}$ 7.5V when output voltage $V_{OUT}$ is 5V. Predetermined value $V_{OUT-REF}$ corresponding to reference voltage $V_{FB-REF}$ is 7.5V.

When USB charger 100 is set to have its voltage rating 20V, meaning the output voltage $V_{OUT}$ is regulated to be at 20V, operating voltage $V_{DD}$ shall be 30V, solely powered by rectifying induced voltage $V_{AUX}$. Since output voltage $V_{OUT}$, currently expected to be regulated at 20V, is higher than predetermined value $V_{OUT-REF}$, 7.5V, enable signal $S_{WDNO-EN}$ de-asserts and high-voltage charging circuit 160 turns OFF, not performing the high-voltage charging.

When the voltage rating is switched from 20V to 5V, output voltage $V_{OUT}$ falls toward 5V, and induced voltage $V_{AUX}$, following the drop of output voltage $V_{OUT}$, toward 7.5V. As power controller 102 consumes power for the control of the power conversion to regulate output voltage $V_{OUT}$, operating voltage $V_{DD}$ decreases steadily from 30V. Once the operating voltage $V_{DD}$ is as low as bottom-limit voltage $V_{BTM}$, which is 11V in this embodiment, the high-voltage charging is performed during valley period $T_{HV-VLY}$ draining charging current $I_{HV-CHG}$ from high-voltage node HV to power operating voltage $V_{DD}$ so as to keep operating voltage $V_{DD}$ above 10V. When output voltage $V_{OUT}$ is 5V, induced voltage $V_{AUX}$ at auxiliary winding AUX is lower than operating voltage $V_{DD}$, so operating voltage $V_{DD}$ is solely powered by the high-voltage charging from voltage $V_{HV}$ or line voltage $V_{REC}$.

Therefore, no matter the voltage rating is 20V or 5V, operating voltage $V_{DD}$ can be maintained to be within an appropriate range from 10V to 30V, so as to let power controller 102 operate properly.

Valley period $T_{HV-VLY}$ is not limited to being defined by the comparison using boundary voltage $V_{BOUNDARY}$. According to another embodiment of the invention, valley period $T_{HV-VLY}$ starts a delay $T_{DELAY}$ later after when voltage $V_{HV}$ has reached a peak, and valley boundary adjuster 176 adaptively adjusts the delay $T_{DELAY}$.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control method for high-voltage charging, suitable for a power supply with a power switch and a high-voltage-tolerant switch, where the high-voltage-tolerant switch is connected between a line voltage and an operating voltage, and the power supply provides power conversion to regulate an output voltage, the control method comprising:
providing a PWM signal to the power switch to perform the power conversion regulating the output voltage;
turning ON the high-voltage-tolerant switch to perform the high-voltage charging at the same time when performing the power conversion;
determining whether the line voltage is inside a voltage valley by comparing the line voltage with a boundary voltage, to accordingly turn on the high-voltage-tolerant switch and perform the high-voltage charging when the line voltage is inside the voltage valley; and
adaptively adjusting the boundary voltage according to the operating voltage;
wherein the high-voltage charging directs a charging current from the line voltage through the high-voltage-tolerant switch to charge the operating voltage.

2. The control method as claimed in claim 1, wherein the step of adaptively adjusting the boundary voltage comprises:
providing a top-limit voltage and a risk voltage, wherein the top-limit voltage is larger than the risk voltage;
increasing the boundary voltage if the operating voltage is below the risk voltage; and
decreasing the boundary voltage if the operating voltage exceeds the top-limit voltage.

3. The control method as claimed in claim 1, comprising:
providing a compensation voltage in response to the output voltage;
generating the PWM signal based on the compensation voltage; and
adaptively adjusting the boundary voltage according to the compensation voltage.

4. The control method as claimed in claim 1, comprising:
checking whether the operating voltage is within a predetermined control range;
disabling the high-voltage charging if the operating voltage exceeds the predetermined control range; and
enabling the high-voltage charging if the operating voltage is below the predetermined control range.

5. The control method as claimed in claim 1, comprising:
detecting the output voltage via an auxiliary winding to control the high-voltage charging.

6. A power controller suitable for a power supply rectifying an alternating-current voltage into a line voltage, wherein the power supply is capable of performing power conversion to regulate an output voltage, the power controller comprising:
a PWM signal generator for providing a PWM signal to a power switch to perform the power conversion regulating the output voltage;
a high-voltage charging circuit, comprising a high-voltage-tolerant switch connected between the line voltage and an operating voltage; and
a high-voltage charging controller, configured to turn ON the high-voltage-tolerant switch to perform high-voltage charging at the same time when performing the power conversion;
wherein:
the high-voltage charging directs a charging current from the line voltage through the high-voltage-tolerant switch to charge the operating voltage;
the high-voltage charging controller includes a comparator configured to: compare the line voltage with a boundary voltage to determine whether the line voltage is inside the voltage valley; and turn on the high-voltage-tolerant switch when the line voltage is inside the voltage valley;
the high-voltage charging controller determines whether the line voltage is inside a voltage valley, to accordingly turn ON the high-voltage-tolerant switch and perform the high-voltage charging when the line voltage is inside the voltage valley; and
the high-voltage charging controller adaptively adjusts the boundary voltage in response to the operating voltage.

7. The power controller as claimed in claim 6, the high-voltage charging controller adaptively adjusts the boundary voltage in response to the operating voltage, so as to keep the operating voltage within an expected range between a risk voltage and a top-limit voltage.

8. The power controller as claimed in claim 6, comprising:
a risk evaluator for power failure, enabling the high-voltage charging controller based on the operating voltage and an induced voltage from an auxiliary winding;
wherein the induced voltage is capable of representing the output voltage.

9. A power supply capable of outputting an output voltage wherein the output voltage is selectively one of a first voltage rating and a second voltage rating higher than the first voltage rating, the power supply comprising:
a rectifier for rectifying an alternating-current voltage into a line voltage;
a transformer comprising a primary winding, a secondary winding and an auxiliary winding, wherein the output voltage is generated by rectifying a first voltage across the secondary winding;
a power switch connected in series with the primary winding; and
a power controller, packaged as an integrated circuit, comprising:
a PWM signal generator for providing a PWM signal to the power switch to perform power conversion regulating the output voltage;
an operating power node at which is an operating voltage; and
a high-voltage charging circuit connected between the line voltage and the operating voltage;
wherein, when the output voltage is regulated at the first voltage rating, the power controller is configured to turn ON the high-voltage charging circuit to perform high-voltage charging, which directs a charging current from the line voltage through the high-voltage charging circuit to charge the operating voltage; and
when the output voltage is regulated at the second voltage rating, the power controller is configured to disable the high-voltage charging and the operating voltage is solely powered by rectifying a second voltage across the auxiliary winding.

10. The power supply as claimed in claim 9, wherein the high-voltage charging circuit comprises a high-voltage-tolerant switch connected between the line voltage and the operating voltage, and the power controller comprises:

a high-voltage charging controller, configured to turn ON the high-voltage-tolerant switch to perform the high-voltage charging at the same time when the output voltage is regulated at the first voltage rating.

11. The power supply as claimed in claim 10, wherein the high-voltage charging controller determines whether the line voltage is inside a voltage valley, turns ON the high-voltage-tolerant switch when the line voltage is inside the voltage valley, and turns OFF the high-voltage-tolerant switch when the line voltage is outside the voltage valley.

12. The power supply as claimed in claim 11, wherein the high-voltage charging controller includes a comparator configured to compare the line voltage with a boundary voltage to determine whether the line voltage is inside the voltage valley.

13. The power supply as claimed in claim 9, wherein the rectifier is a first rectifier, the power supply further comprises a second rectifier for regulating the alternating-current voltage into an input voltage, and the primary winding is connected between the input voltage and the power switch.

14. The power supply as claimed in claim 9, wherein, when the operating voltage is below an under-voltage-lockout voltage, the power controller constantly turns OFF the power switch and the high-voltage charging circuit is turned ON to perform the high-voltage charging.

* * * * *